United States Patent
Shibasaki et al.

(10) Patent No.: US 8,620,548 B2
(45) Date of Patent: *Dec. 31, 2013

(54) BRAKE-SWITCH FAILURE DIAGNOSIS METHOD AND BRAKE-SWITCH FAILURE DIAGNOSIS SYSTEM

(75) Inventors: Masaki Shibasaki, Saitama (JP); Tetsuya Shinguchi, Saitama (JP); Takayuki Wakai, Saitama (JP); Masaaki Maeno, Saitama (JP)

(73) Assignee: Bosch Corporation, Tokyo (JP)

( * ) Notice: Subject to any disclaimer, the term of this patent is extended or adjusted under 35 U.S.C. 154(b) by 741 days.

This patent is subject to a terminal disclaimer.

(21) Appl. No.: 12/516,929

(22) PCT Filed: Nov. 29, 2007

(86) PCT No.: PCT/JP2007/073081
§ 371 (c)(1),
(2), (4) Date: Oct. 23, 2009

(87) PCT Pub. No.: WO2008/066124
PCT Pub. Date: Jun. 5, 2008

(65) Prior Publication Data
US 2010/0036559 A1   Feb. 11, 2010

(30) Foreign Application Priority Data
Nov. 30, 2006   (JP) ................. 2006-323964

(51) Int. Cl.
*G06F 7/46*       (2006.01)
*B60T 7/06*       (2006.01)
*B60T 15/14*      (2006.01)

(52) U.S. Cl.
CPC ... *G06F 7/46* (2013.01); *B60T 7/06* (2013.01); *B60T 15/14* (2013.01)
USPC ................. 701/70; 701/71; 701/76; 701/92; 303/20

(58) Field of Classification Search
USPC ........... 701/70, 76, 92, 71; 303/155, 113.4, 3, 303/10, 13, 14, 15, 20
See application file for complete search history.

(56) References Cited

U.S. PATENT DOCUMENTS

| | | | | |
|---|---|---|---|---|
| 4,776,643 A | * | 10/1988 | Leiber | 303/113.4 |
| 5,951,116 A | * | 9/1999 | Nagasaka et al. | 303/14 |
| 5,954,407 A | * | 9/1999 | Schramm et al. | 303/113.4 |
| 6,244,675 B1 | * | 6/2001 | Behrends et al. | 303/155 |
| 2004/0090112 A1 | * | 5/2004 | Tachiiri et al. | 303/20 |
| 2005/0131613 A1 | * | 6/2005 | Bohm et al. | 701/71 |
| 2005/0173980 A1 | * | 8/2005 | Bohm et al. | 303/155 |

FOREIGN PATENT DOCUMENTS

JP      2772737 B2   4/1998

* cited by examiner

*Primary Examiner* — Thomas Black
*Assistant Examiner* — Dale W Hilgendorf
(74) *Attorney, Agent, or Firm* — Michael Best & Friedrich LLP

(57) ABSTRACT

Secure failure diagnosis of a brake switch is enabled with a simple configuration. Inconsistency detection is performed for output signals from two brake switches 6a and 6b provided such that an operation condition of a brake pedal 1 may be detected (S102), and when inconsistency is detected, after a certain time has passed from the relevant detection point, inconsistency detection is newly performed for output signals from the two brake switches 6a and 6b (S108), and when inconsistency is detected again, a determination counter performs count of a predetermined incremental value, those operation being periodically repeated (S110), and when a count value reaches a predetermined value α after the determination counter performs the count, the two brake switches 6a and 6b are determined to be failed (S114 and S118).

3 Claims, 3 Drawing Sheets

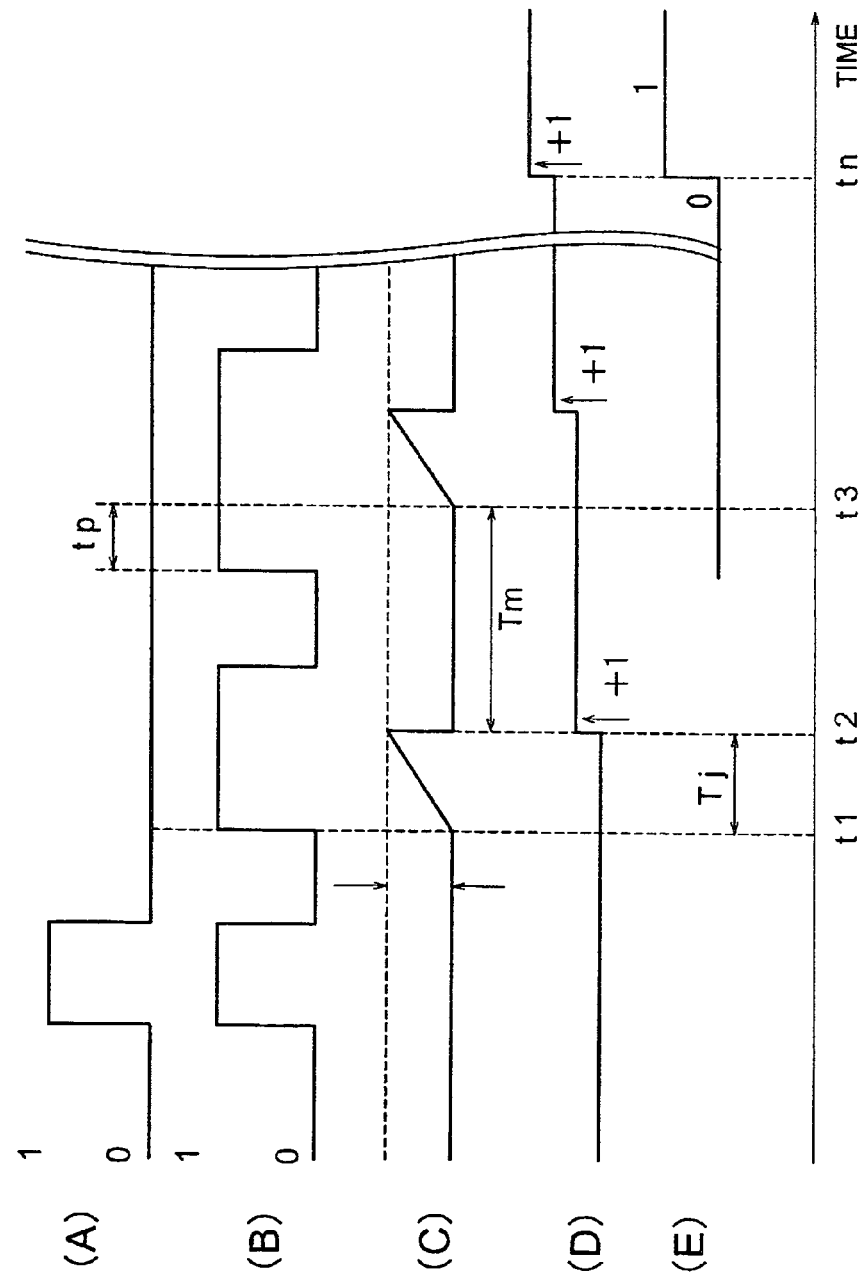

BRAKE-SWITCH FAILURE DIAGNOSIS METHOD AND BRAKE-SWITCH FAILURE DIAGNOSIS SYSTEM

BACKGROUND OF THE INVENTION

1. Field of the Invention

The present invention relates to failure diagnosis of a brake switch for detecting an operation condition of a brake pedal of a vehicle such as motor vehicle, and particularly relates to a method and a system for achieving failure diagnosis with a simple configuration, improved reliability and the like.

2. Description of the Related Art

As this type of system, various systems have been proposed in the past, including a system as shown in Japanese Patent Publication No. 2,772,737, which is configured to synthetically determine presence of failure of a brake switch from internal pressure of a booster for boosting braking liquid pressure and variation of the internal pressure, brake pedal force applied to a brake pedal, and braking pressure.

However, in the system disclosed in the patent publication, while many determination elements are used and therefore highly reliable diagnosis may be expected, since the system requires a signal depending on booster pressure, and a signal depending on brake pedal force, and furthermore a signal depending on braking pressure, increased number of sensors are required for a vehicle as a whole, in addition, number of wirings is increased, the wirings connecting between the sensors and an electronic control unit performing electronic control of the vehicle. Consequently, the system has not always been acceptable for a vehicle being limited in setting space of components, and desired to have a simple configuration and reduced number of the components to the utmost.

SUMMARY OF THE INVENTION

The invention was made in the light of the circumstances, and provides a brake-switch failure diagnosis method and a brake-switch failure diagnosis system, which enable secure failure diagnosis with a simple configuration.

According to a first aspect of the invention, a brake-switch failure diagnosis method for detecting an operation condition of a brake pedal is provided, which is configured in such a manner that inconsistency detection is performed for output signals from two brake switches provided such that an operation condition of a brake pedal may be detected, and when inconsistency is detected, after a certain time has passed from the relevant detection point, inconsistency detection is newly performed for output signals from the two brake switches, and when inconsistency is detected again, a counter performs count of a predetermined incremental value, those operation being periodically repeated, and when a count value after performing the count reaches a predetermined value, the two brake switches are determined to be failed.

According to a second aspect of the invention, a brake-switch failure diagnosis system for detecting an operation condition of a brake pedal is provided, which includes two brake switches, each outputting a predetermined signal depending on an operation condition of a brake pedal, and an electronic control unit that is inputted with respective output signals from the two brake switches to determine presence of failure of each brake switch, wherein the electronic control unit is configured to operate so that inconsistency detection is performed for output signals from the two brake switches, and when inconsistency is detected, after a certain time has passed from the relevant detection point, inconsistency detection is newly performed for output signals from the two brake switches, and when the inconsistency is detected again, a counter performs count of a predetermined incremental value, those operation being periodically repeated, and when a count value after performing the count reaches a predetermined value, the two brake switches are determined to be failed.

BRIEF DESCRIPTION OF THE DRAWINGS

FIG. 3 is timing charts illustrating brake-switch failure determination operation in the embodiment of the invention, where FIG. 3(A) shows a timing chart showing an example of change in output signal from a first brake switch, FIG. 3(B) shows a timing chart showing an example of change in output signal from a second brake switch, FIG. 3(C) shows a timing chart simulatively showing elapsed time in a ramp waveform with timing by a determination delay timer, FIG. 3(D) shows a timing chart simulatively showing change in count value of a determination counter in a step-like waveform, and FIG. 3(E) shows a timing chart showing a logic signal generated in the case that the first and second brake switches are determined to be failed.

DETAILED DESCRIPTION OF THE PREFERRED EMBODIMENTS

Hereinafter, a preferred embodiment of the invention will be described with reference to FIGS. 1 to 3.

It will be noted that the members and arrangements described below are not intended to limit the present invention and can be variously modified within the scope of the gist of the present invention.

First, a configuration example of a vehicle braking system using a brake-switch failure diagnosis method in the embodiment of the invention is described with reference to FIG. 1.

Figure 1:
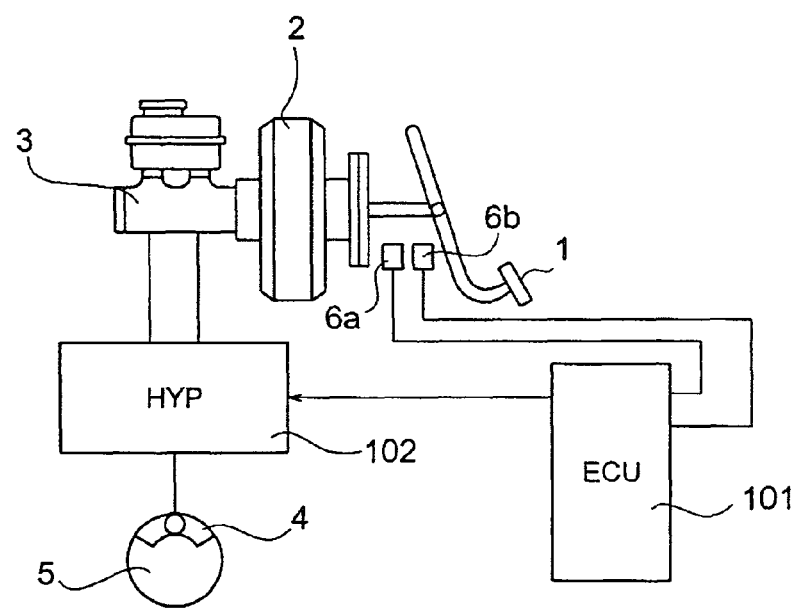
FIG. 1 is a block diagram showing a configuration example of a vehicle braking system using a brake-switch failure diagnosis method of an embodiment of the invention.

FIG. 1 shows a schematic configuration example of a vehicle braking system of a four-wheeled motor vehicle, in which depression amount of a brake pedal 1 is converted into hydraulic pressure by a brake master cylinder 2 depending on the depression amount. Hydraulic pressure generated in the brake master cylinder 2 is boosted by a booster 3, and the boosted pressure is transmitted to a wheel cylinder 4 as braking pressure via a hydraulic pressure unit (mentioned as "HYP" in FIG. 1) 102, and the wheel cylinder 4 exerts brake force on a wheel 5.

The hydraulic pressure unit 102 has piping (not shown) that connects between the brake master cylinder 2 and the wheel cylinder 4 to circulate a braking liquid between them, an electromagnetic switching valve (not shown) for controlling circulation of the braking liquid, and the like.

In FIG. 1, only one wheel cylinder 4 and only one wheel 5 are shown for simplifying the drawing to facilitate understanding. However, these are actually provided by number corresponding to number of wheels respectively.

In the embodiment of the invention, two brake switches 6a and 6b having the same configuration, each of which outputs an ON/OFF signal depending on whether the brake pedal 1 is depressed, are provided at an appropriate place near the brake pedal 1 so that presence of depression of the brake pedal 1 may be detected.

An output signal from each of the brake switches 6a and 6b is inputted into an electronic control unit 101 performing operation control of the braking system and the like.

The electronic control unit 101 is configured to have main components such as a microcomputer (not shown) having a well-known configuration as a core component, storage elements (not shown) such as RAM and ROM, and a drive circuit (not shown) for driving an electromagnetic switching valve (not shown) of the hydraulic pressure unit 102.

Figure 2:
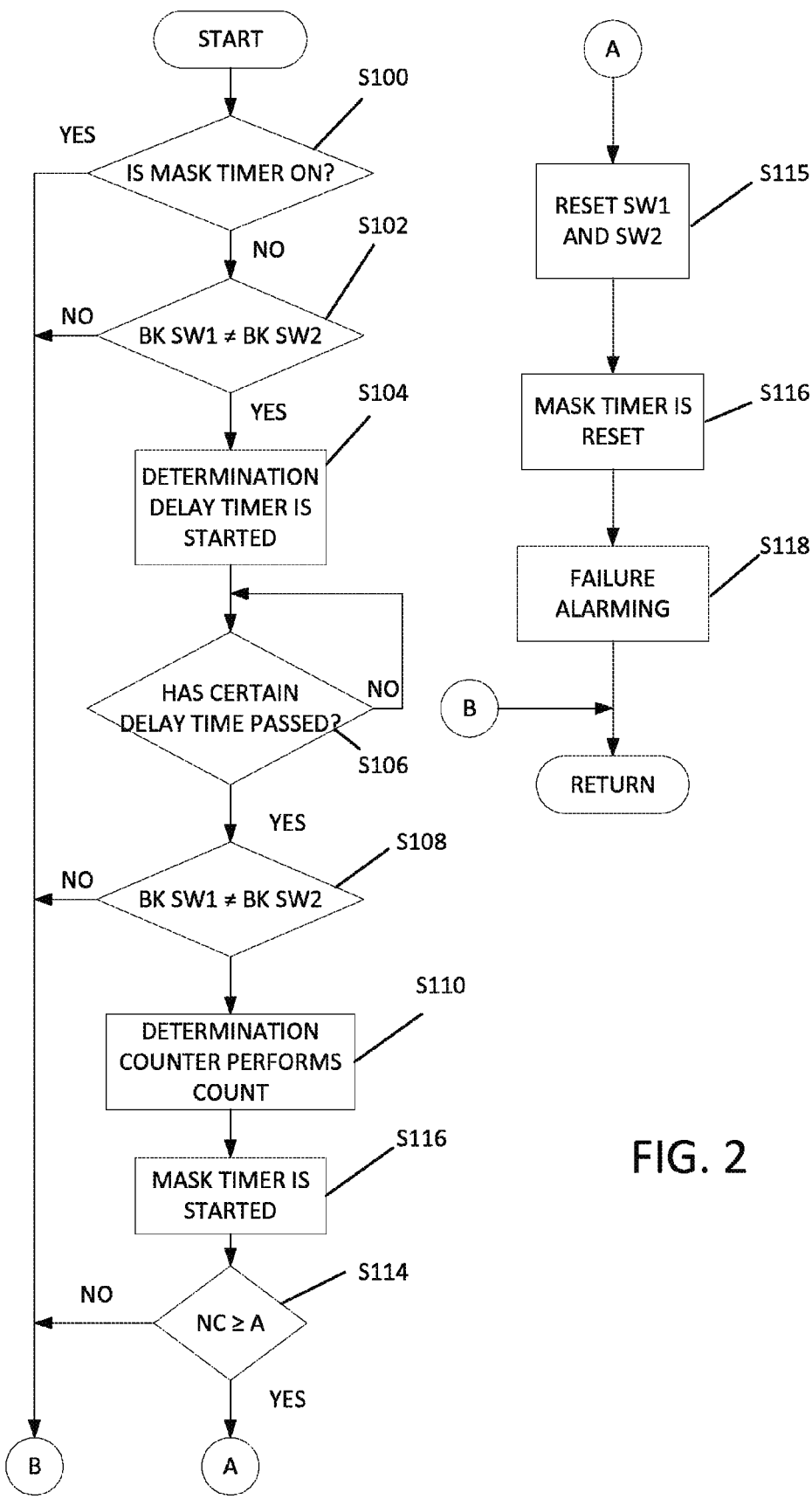
FIG. 2 is a subroutine flowchart showing a procedure of brake-switch failure diagnosis processing performed by an electronic control unit configuring the vehicle braking system shown in FIG. 1.

FIG. 2 shows a subroutine flowchart showing a procedure of brake-switch failure diagnosis processing performed by such an electronic control unit 101. Hereinafter, the brake-switch failure diagnosis processing of the embodiment of the invention is described with reference to the flowchart.

When the processing is started, first, whether a mask timer is ON is determined (refer to step S100 in FIG. 2). The mask timer is operated to avoid determination of respective output states of the first and second brake switches 6a and 6b for a certain period Tm (as described in detail later). Since the timer itself is configured by using well-known so-called timer software, detailed description of the timer is omitted here.

In the step S100, when the mask timer is determined to be ON (a case of YES), it is considered to be not a time to determine the respective output states of the first and second brake switches 6a and 6b, and a series of processing is finished. Then, processing is temporarily returned to a not-shown main routine, and predetermined processing is performed therein, and then the subroutine processing is performed again.

On the other hand, when the mask timer is determined to be not ON (a case of NO) in the step S100, processing proceeds to step S102, and whether inconsistency occurs between the output signals inputted into the electronic control unit 101 from the respective first and second brake switches 6a and 6b is determined in the step S102.

Here, a state of an output signal from the first brake switch 6a is shown as "BK SW1" and a state of an output signal from the second brake switch 6b is shown as "BK SW2" respectively.

In the embodiment of the invention, when the brake pedal 1 is depressed, both the first and second brake switches 6a and 6b are into an ON-state (closing state), and the electronic control unit 101 recognizes that BK SW1=BK SW2=ON (or High in logic value) is established. The first and second brake switches 6a and 6b need not necessarily be limited to those being into the ON-state when the brake pedal 1 is depressed as above, and may have reverse logic, that is, the brake switches may be into an OFF-state when the brake pedal 1 is depressed.

Therefore, when states of the output signals from the first and second brake switches 6a and 6b are inconsistent (BK SW1≠BK SW2), it means that one switch is ON, and the other switch is OFF (opening state).

In the step S102, when it is determined that the output signals from the first and second brake switches 6a and 6b are not inconsistent (BK SW1≠BK SW2) (in the case of NO), the first and second brake switches 6a and 6b are regarded to be normal respectively, and a series of processing is finished.

On the other hand, in the step S102, when BK SW1≠BK SW2 is determined to be established, that is, inconsistency occurs between output signals from the first and second brake switches 6a and 6b (in the case of YES), a determination delay timer is started (refer to step S104 in FIG. 2).

The determination delay timer is configured by using well known, so-called timer software as the mask timer, and performs timing of a certain time.

In the embodiment of the invention, in case that inconsistency is detected between output signals from the first and second brake switches 6a and 6b, the output signals are not immediately determined to be inconsistent, and when inconsistency is still detected between output signals thereof even after a certain time has passed, the output signals from the first and second brake switches 6a and 6b are determined to be inconsistent. The purpose of this is that in the case that inconsistency accidentally occurs between output signals from the first and second brake switches 6a and 6b due to some reason, or in the case that although output signals from the first and second brake switches 6a and 6b are actually not inconsistent, a signal is falsely inputted into the electronic control unit 101 due to noise or the like, the signal being equivalent to a signal showing that output signals from the first and second brake switches 6a and 6b are inconsistent, the brake switches are avoided from being erroneously determined to be failed, so that reliability of failure determination is secured.

When it is determined that certain delay time Tj has passed since the determination delay timer began timing (refer to step S106 in FIG. 2), processing proceeds to step S108, and whether output signals from the first and second brake switches 6a and 6b are inconsistent is determined again in the step S108.

In the step S108, when it is determined that BK SW1≠BK SW2 is not established (in the case of NO), output signals from the first and second brake switches 6a and 6b are regarded to be not inconsistent, and a series of processing is finished. The series of processing is repeated while a vehicle is driven.

On the other hand, in the step S108, when BK SW1≠BK SW2 is determined to be established, that is, output signals from the first and second brake switches 6a and 6b are determined to be inconsistent (in the case of YES), a determination counter is increased in count value Nc by a certain incremental value, namely, for example, one (performs count) (refer to step S110 in FIG. 2). Concurrently with this, the determination delay timer is cleared, and the mask timer begins count (refer to step S112 in FIG. 2).

As generally described before, the mask timer is a software timer, which is provided for the purpose that after BK SW1≠BK SW2 is determined to be established in the step S108, whether output signals from the first and second brake switches 6a and 6b are inconsistent is avoided to be determined for a certain period Tm. The purpose of this is that in the case that inconsistency accidentally occurs between output signals from the first and second brake switches 6a and 6b due to some reason, or in the case that although output signals from the first and second brake switches 6a and 6b are actually not inconsistent, a signal is falsely inputted into the electronic control unit 101 due to noise or the like, the signal being equivalent to a signal showing that output signals from the first and second brake switches 6a and 6b are inconsistent, whether output signals from the first and second brake switches 6a and 6b are inconsistent is avoided to be determined, so that reliability of failure determination is improved.

In step S114, when the count value Nc of the determination counter is determined to be less than a predetermined value α (in the case of NO), the first and second brake switches 6a and 6b are regarded to be not failed, and a series of processing is finished.

On the other hand, in the step S114, when the count value Nc of the determination counter is determined to be equal to or larger than the predetermined value α (in the case of YES), the first and second brake switches 6a and 6b are regarded to be failed, and the brake switches are forcibly reset (step S115 in FIG. 2) even if the mask timer is ON, the mask timer is then reset (step S116 in FIG. 2), and failure alarming is performed (refer to step S118 in FIG. 2).

In this way, in the embodiment of the invention, a determination counter is provided, and when a count value of the counter is equal to or larger than a predetermined value, the first and second brake switches 6a and 6b are determined to be failed, so that in the case that the output signals from the first and second brake switches 6a and 6b become inconsistent due to some transient reason, or in the case that the output signals from the first and second brake switches 6a and 6b become inconsistent due to noise entered into the electronic control unit 101 or the like, the brake switches are avoided to be immediately determined to be failed, leading to relatively secure determination.

For the failure alarming, various methods being generally well known are preferably used, including failure display on a display element or a display apparatus, lighting of a lighting element or the like, rumbling of a rumbling element such as a buzzer, and one or a combination of the methods may be optionally used without being limited to a particular method.

Next, description is made on brake-switch failure determination operation, which is performed when the brake-switch failure determination processing is performed, with reference to timing charts shown in FIG. 3.

First, in FIG. 3, FIG. 3(A) shows a timing chart showing an example of change in output signal from the first brake switch 6a, FIG. 3(B) shows a timing chart showing an example of change in output signal from the second brake switch 6b, FIG. 3(C) shows a timing chart simulatively showing elapsed time in a ramp waveform with timing by the determination delay timer, FIG. 3(D) shows a timing chart simulatively showing change in count value of the determination counter in a step-like waveform, and FIG. 3(E) shows a timing chart showing a logic signal generated in response to failure alarming (refer to the step S118 in FIG. 2) showing that the first and second brake switches 6a and 6b are determined to be failed.

In the example of FIG. 3, immediately before time t1, the respective first and second brake switches 6a and 6b are normal, and output the same signal. However, immediately after the time t1, while output from the first brake switch 6a has a state corresponding to a logic value Low, output from the second brake switch 6b has a state corresponding to a logic value High, leading to inconsistency between output signals from the respective brake switches.

Then, in the electronic control unit 101, the output signals from the first and second brake switches 6a and 6b are determined to be inconsistent, and the determination delay timer begins timing at the time t1 (refer to FIG. 3(C)).

At time t2 at which the determination delay timer completes timing of certain time Tj, output signals from the first and second brake switches 6a and 6b are still inconsistent (refer to FIG. 3(C)). Therefore, the electronic control unit 101 determines output signals from the first and second brake switches 6a and 6b to be inconsistent, in addition, a count value of the determination counter is increased by one in the electronic control unit (refer to FIG. 3(D)).

At the same time when the determination delay timer completes timing, and a count value of the determination counter is increased, the mask timer begins timing, so that whether output signals from the first and second brake switches 6a and 6b are inconsistent is avoided (prohibited) to be determined for the certain period Tm (refer to FIG. 3(C)).

Consequently, even if output signals from the first and second brake switches 6a and 6b become inconsistent before the mask timer finishes timing of the certain time Tm, output signals from the first and second brake switches 6a and 6b are not determined to be inconsistent during a period tp from a point, at which the output signals become inconsistent, to a point at which the mask timer finishes timing of the certain time Tm (refer to regions before and after time t3 in FIG. 3(B)).

At time t3 at which the mask timer completes timing of the certain time Tm, whether output signals from the first and second brake switches 6a and 6b are inconsistent is started to be determined. When the output signals from the first and second brake switches 6a and 6b are still inconsistent, the determination delay timer starts timing as described before (refer to FIG. 3(C)).

After that, the above operation is repeated in the same way, and when the count value Nc of the determination counter reaches the predetermined value α at time tn, a logic signal having a logic value of High, meaning that the first and second brake switches 6a and 6b are failed, is generated in the electronic control unit 101 (refer to FIG. 3(E)) as a trigger signal for failure alarming or the like.

As described hereinbefore, the brake-switch failure diagnosis method and the brake-switch failure diagnosis system according to the invention are suitably used as one vehicle operation failure diagnosis of a four-wheeled motor vehicle having a dual circuit brake switch.

According to the invention, failure of a brake switch may be determined by using only a signal from the brake switch without using a plurality of signals from sensors other than the brake switch unlike a prior case, in addition, reliable determination can be made by repeating signal detection several times. Therefore, highly reliable failure determination can be advantageously achieved with a simple configuration, contributing to provide a braking system that achieves highly reliable operation.

What is claimed is:

1. A brake-switch failure diagnosis method for detecting an operation condition of a brake pedal, the method comprising:
   periodically repeatedly performing inconsistency detection between output signals from two identical brake switches provided such that the operation condition of the brake pedal may be detected, and when inconsistency is detected at a relevant detection point,
   performing a new inconsistency detection between output signals from the two brake switches after a first certain time has passed from the relevant detection point, and when inconsistency is detected again,
   performing, with a counter at a relevant count point, a count of a predetermined incremental value,
   determining that the two brake switches are failed when a count value reaches a predetermined value, and
   resetting the two brake switches when it is determined the two brake switches are failed, and
   wherein, when the counter performs the count, inconsistency detection for output signals from the two brake switches is prohibited for a second certain time from the relevant count point.

2. A brake-switch failure diagnosis program, the program executed in a brake-switch failure diagnosis system configured to receive output signals from brake switches for detecting an operation condition of a brake pedal so that failure diagnosis of the brake switch is performed, the program including:

a step of periodically repeatedly performing inconsistency detection between output signals from two identical brake switches provided such that the operation condition of the brake pedal may be detected, a step that when inconsistency is detected, at a relevant detection point, between output signals from the two brake switches, a determination delay timer is allowed to perform timing for a first certain period from the relevant detection point, a step that when the determination delay timer finishes timing for the certain period, inconsistency detection is newly performed between output signals from the two brake switches, and when inconsistency is newly detected between the output signals from the two brake switches, a determination counter performs a count of a predetermined incremental value at a relevant count point, a step that after the determination counter performs the count, when a count value reaches a predetermined value, the two brake switches are determined to be failed, and a step that when it is determined the two brake switches are failed the two brake switches are reset, wherein when the determination counter performs the count, periodical inconsistency detection for output signals from the two brake switches is prohibited for a second certain time from the relevant count point.

3. A brake-switch failure diagnosis system for detecting an operation condition of a brake pedal, the system including two identical brake switches, each outputting a predetermined signal depending on the operation condition of the brake pedal, and an electronic control unit that is inputted with respective output signals from the two brake switches to determine presence of failure of each brake switch, wherein:

the electronic control unit is configured to periodically repeatedly perform inconsistency detection between output signals from the two brake switches, and when inconsistency is detected at a relevant detection point, perform a new inconsistency detection between output signals from the two brake switches after a first certain time has passed from the relevant detection point, and when inconsistency is detected again, perform, with a counter, at a relevant count point, a count of a predetermined incremental value, determine that the two brake switches are failed when a count value reaches a predetermined value after performing the count, and resetting the two brake switches when it is determined the two brake switches are failed, wherein when the counter performs the count, inconsistency detection for output signals from the two brake switches is prohibited for a second certain time from the relevant count point.

* * * * *